United States Patent [19]
Vignaud et al.

[11] 3,872,365

[45] Mar. 18, 1975

[54] METHODS OF AND DEVICES FOR BRAKING AND INDEXING THE SPINDLE OF A MACHINE TOOL ROTATING AT HIGH SPEED

[75] Inventors: Jean-Pierre Vignaud; Claude Sebire; Pierre Riss, all of Billancourt, France

[73] Assignee: Regie Nationale Des Usines Renault, Billancourt (Hauts de Seine), France

[22] Filed: Sept. 20, 1973

[21] Appl. No.: 399,247

[30] Foreign Application Priority Data
Sept. 26, 1972 France .......................... 72.34060
Aug. 3, 1973 France .......................... 73.28484

[52] U.S. Cl. .............................. 318/265, 318/369
[51] Int. Cl. .............................................. H02p 3/06
[58] Field of Search .......... 318/162, 163, 265, 266, 318/273, 369, 603; 187/29

[56] References Cited
UNITED STATES PATENTS

| | | | |
|---|---|---|---|
| 3,564,367 | 2/1971 | Wanner et al. | 318/369 X |
| 3,721,811 | 3/1973 | Taylor et al. | 318/369 X |
| 3,750,850 | 8/1973 | Winkler et al. | 187/29 |

*Primary Examiner*—Robert K. Schaefer
*Assistant Examiner*—W. E. Duncanson, Jr.
*Attorney, Agent, or Firm*—Stevens, Davis, Miller & Mosher

[57] ABSTRACT

A method of braking and indexing a mechanical member rotating at high speed, notably a machine tool spindle, wherein the starting point of the high-speed indexing phase is triggered and the braking phase is monitored at least partially according to an optimum velocity/space curve of parabolic shape; this invention further comprises a device for carrying out this method.

5 Claims, 4 Drawing Figures

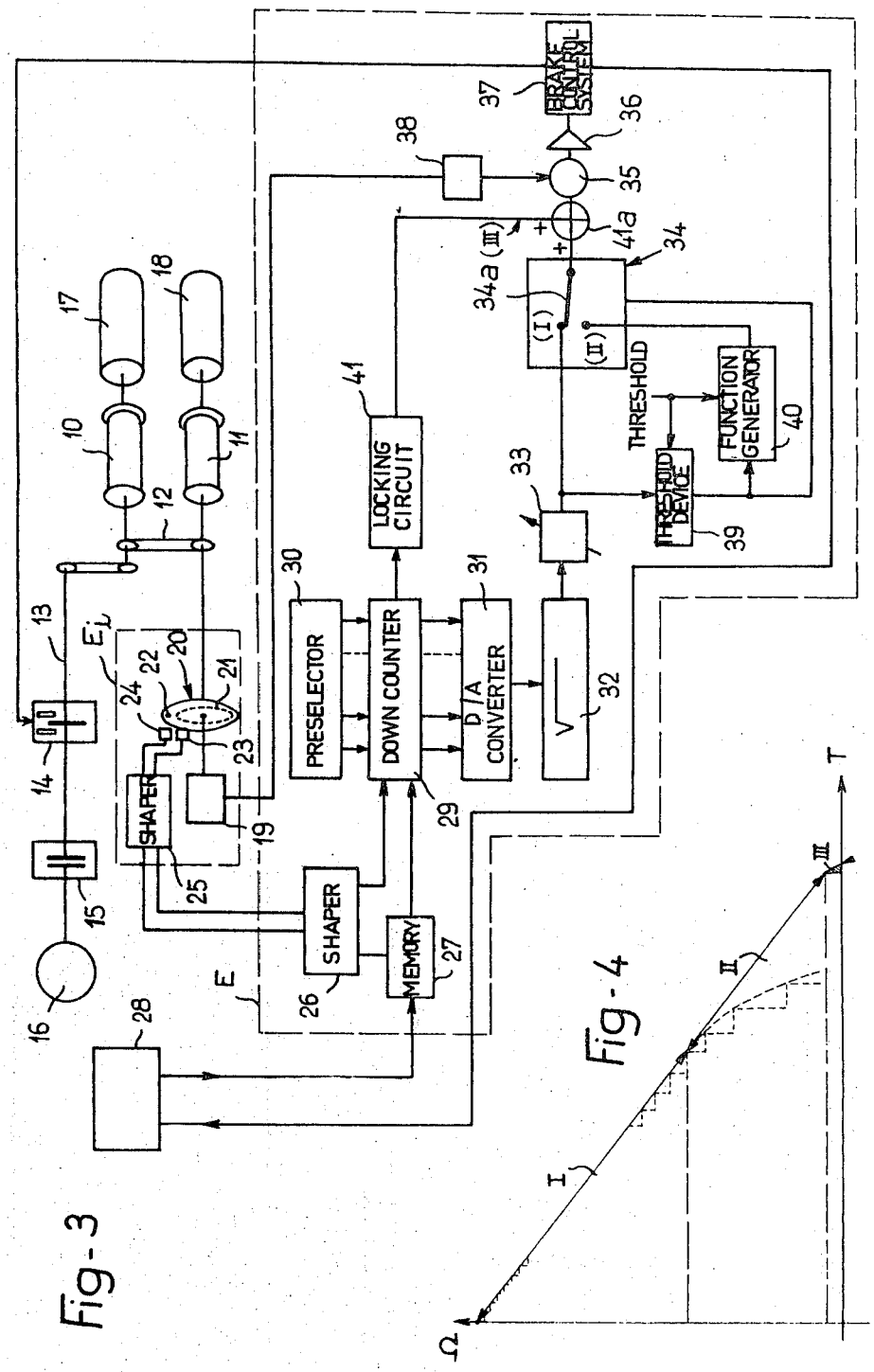

METHODS OF AND DEVICES FOR BRAKING AND INDEXING THE SPINDLE OF A MACHINE TOOL ROTATING AT HIGH SPEED

The present invention relates to a method of and a device for stopping in a predetermined angular position the spindle of a machine tool rotating at high speed.

Consequently, this device, adapted to be mounted on machine tools having very short operating cycles (such as transfer machines or the like), must be capable of performing the braking and indexing action very rapidly in order not to increase unduly the already very short operating cycle time by adding a time percentage corresponding to an abnormally long hold-up time.

The general technique implemented for solving this problem consists in applying the brake suddenly with force in order to reduce the spindle speed sharply from its machining speed $\omega_o$ to a low speed $\omega_i$ consistent with the indexing operation. Since this speed $\omega_i$ is measured, the spindle is driven positively, and the indexing step is started and causes the indexing mechanism to be connected in.

Thus, hereto known devices for carrying out prior art methods require the use of a fast motor and also of a slow motor (whether hydraulic or electrical), means for locating the speed level, and mechanisms for indexing and presenting the indexing means. Furthermore, they require relatively long and hardly compressible operating times, due to the dissociation of the braking and indexing steps from each other. In fact, only the braking time can be reduced, but to a small extent, for deceleration values likely to prove detrimental to the mechanisms are rapidly attained. The longer time period is the indexing time and requires at the most a complete revolution of the spindle at low speed.

The method of the present invention is based on the principle of associating the braking and indexing functions, and reducing gradually the speed without resorting to a speed level or "flat spot."

To this end, according to this invention, the indexing operation is started at high speed or, in other words, the initial point (position - deceleration sequence time) is somewhat "triggered", whereafter the braking action is monitored at least partially by adhering to an optimum speed/space curve of parabolic shape. Thus, as a function of the braking capacity, it is possible, when a predetermined distance has been covered, to reduce the speed to zero value and to cause the tangent to the speed/space curve to be vertical.

It can easily be proved that in the case of a uniformly decelerated movement, speed may be expressed as a function of space in the form: $\omega = \sqrt{k(\theta_1 - \theta)}$, wherein $\theta_1$ is the distance at which it is desired to obtain zero speed. Under these conditions it is clear that if a velocity evolution law such as $\omega = \sqrt{k(\theta_1 - \theta)}$ can be associated with the covered distance, and the actual velocity of the spindle can be controlled by this theoretical velocity, the braking and indexing problems are solved simultaneously.

The device for carrying out the above-defined method comprises only simple, economical and reliable electronic means in addition to a brake of which the torque can be monitored with direct current.

More particularly, the device may comprise a pick-up receiving pulses transmitted as a function of the angular position of the spindle, said pulses being fed to a down counter adapted to count down these pulses from a predetermined initial value corresponding to the desired angular braking distance, an AND gate permitting this count-down only when it receives the braking order and an impulse corresponding to the starting of the indexing function, the digital or numerical output signal of said down counter being converted into an analog signal in a converter followed by an analog square-root extractor of which the output signal denoting the preset speed is compared with the actual spindle velocity for automatically controlling the brake torque.

However, in the specific cases of precision machining spindles and in machines having very short operating cycle periods it is highly desirable to obtain a very high degree of precision, of the order of the angular degree, while preserving a relatively short braking time.

With the device above referred to and considering on the one hand the time constants of an electrically controlled brake at the application and at the release thereof (of the order of 0.13 second), and on the other hand the desired braking time (for example one second), the operation involves a relatively low gain for the speed control loop. Moreover, the preset speed departs from what it should be inasmuch as the time and amplitude of the "steps" along this velocity/time preset ratio increases, especially at the end of the brake application, and the envelope of this preset velocity which should theoretically be linear actually tends to assume a parabolic pattern detrimental to the final precision.

In this case it is possible to improve the degree of precision thus obtained and preserve the desirable braking and indexing rapidity by resorting partially to the above-defined method during a first phase of the braking and indexing process, and substituting two new phases to its final phase for obtaining the desired result.

In view of the foregoing the braking and indexing method according to this invention is characterized in that it consists in monitoring the braking function during three successive phases:

the first phase follows a substantially linear section of a velocity/time curve corresponding to the aforesaid velocity/space curve having a parabolic shape of numerical or digital definition;

the second phase follows a linear velocity/time curve determined by a function generator and triggered below a predetermined threshold of the first phase;

the third phase is a final locking phase triggered in response to a final predetermined digital or numerical information of the aforesaid digital or numerical definition.

This invention is further concerned with a device for braking and indexing or positioning a rotary mechanical member revolving at high speed, for example the spindle of a machine tool, according to the above-described three-phase method, this device being characterized in that it comprises a pick-up for receiving multiple pulses transmitted as a function of the angular position of the spindle, another pick-up for receiving the brake application starting pulses transmitted in a predetermined angular position of said spindle, a preselection digital down counter to which said multiple pulse pick-up is connected, a count-down permitting circuit responsive to the braking order and interposed between said brake application starting pulse pick-up and said digital down counter for permitting said count down only when said starting pulse has been transmitted, an A/D (analog/digit) converter for converting the output signals of said down counter, followed by an analog square-root extractor producing a first signal denoting the preset spindle speed, a threshold device responsive to a predetermined threshold of said preset signal during its linear evolution and co-acting with a linear function generator transmitting a second signal denoting the preset speed of said spindle, a switching device responsive to said threshold device for transmitting said first and second preset signals in succession to a comparator operatively connected to a signal generator delivering a signal corresponding to the actual spindle speed, a spindle braking control device responsive to an error signal transmitted from said comparator, and a circuit adapted to force said comparator to a condition of maximum braking control action responsive to a predetermined numerical state of the final count down of said down counter.

Other features and advantages of this inventiol will appear as the following description proceeds with reference to the attached drawings given by way of example and wherein:

FIG. 3 is another block diagram of a device for braking and indexing a spindle, this device operating according to the diagram of FIG. 4, and FIG. 4 is the velocity/time diagram of the spindle, illustrating the three braking-indexing phases, the velocity being denoted $\Omega$ and the time T.

Figure 1:
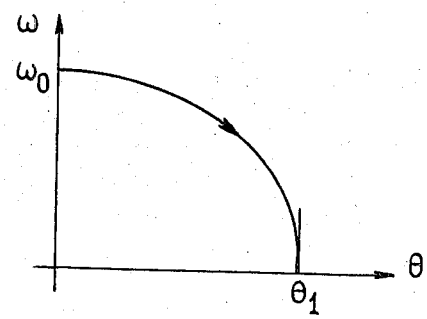
FIG. 1 is a diagram illustrating the optimum curve of the function $\omega = f(\theta)$ obtained through the present invention.

Referring first to FIG. 1, the curve illustrates the function $\omega = f(\theta)$, i.e., of the spindle velocity as a function of the distance covered during the brake application or braking action. $\omega_o$ illustrates the machining speed of the spindle and it is desired to reduce this speed to zero after the distance $\theta_1$ has been covered. The optimum shape of this curve is a parabolic branch. It may be noted in this respect that the "step" or "level" notion encountered in hitherto known devices is eliminated completely, whence are obtained considerable savings of time permitting a rapid but not too fierce brake application.

Figure 2:
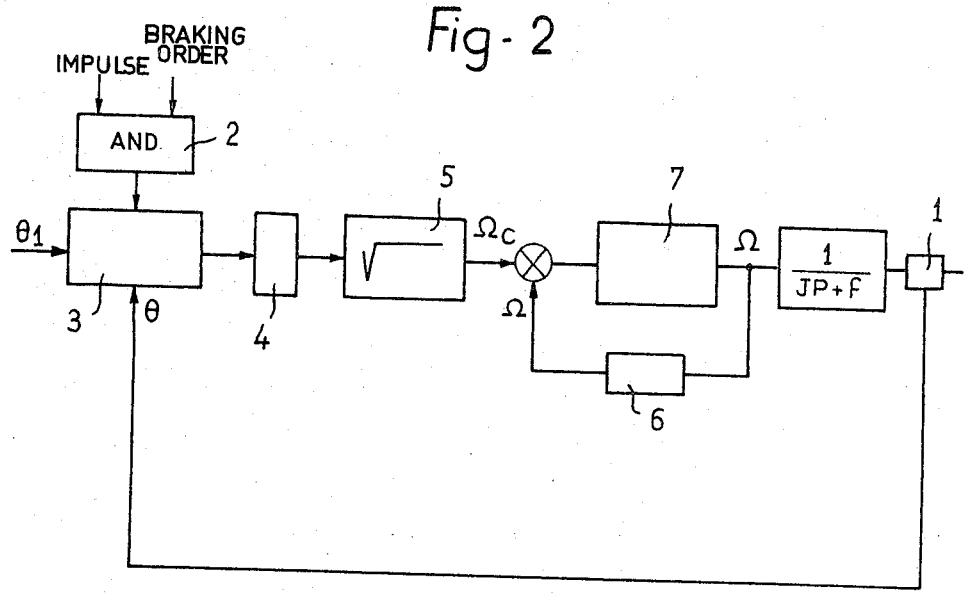
FIG. 2 is a block diagram showing the device for carrying out the single-phase method of this invention.

In FIG. 2 the block diagram of a device for carrying out the method of this invention is illustrated. It will be seen that this device comprises a pulse counter 1 receiving pulses $\theta$ delivered for example by the teeth of a toothed wheel rigid with the spindle B, the number of teeth of this wheel constituting an important parameter in the final stopping precision.

These pulses are fed to a down counter 3. An AND gate 2 is provided for delivering the count down order which can only be transmitted when the braking order has been issued and the indexing starting pulse has been received. This indexing starting impulse is delivered by a special pick-up (not shown) mounted on the spindle.

It will thus be seen that the count down performed by the counter 3 can begin only at a well-defined angular position of the spindle, given by the starting impulse pick-up. The count down of pulses $\theta$ transmitted from pick-up 1 and through the spindle teeth takes place from a predetermined initial value of $\theta_1$ corresponding to the desired braking angular distance. The number of pulses issuing from pick-up 3 is therefore $\theta_1 - \theta$ ($\theta$ being the number of pulses corresponding to the position at moment T) and these pulses are fed to a D/A converter 4 delivering a signal having the shape ($\theta_1 - \theta$) $2\Omega_o/To$, wherein $\Omega_o$ is the machining speed of the spindle and To the time contemplated for braking the spindle to a complete standstill. This signal is fed to an analog square-root extractor 5 delivering a signal representing the preset speed:

$$\Omega c = \sqrt{(\theta_1 - \theta) 2\Omega_o/To)}$$

On the other hand, a tachometric current generator 6 permits of measuring the actual speed $\Omega$ of the spindle B. $\Omega$ and $\Omega c$ are compared at 8 of which the output signal permits of controlling electrically the torque of brake 7 adapted to be monitored by direct current and to produce a braking force at zero speed. The braking curve thus obtained is illustrated in FIG. 1.

The device shown in FIG. 3 comprises two spindles 10, 11 operatively interconnected through slipless coupling or transmission members 12, such as cogged belts or chains, and operatively connected on the other hand with a driving shaft 13 carrying an electromagnetic brake 14 coupled in this case through a clutch 15 to an electric driving motor 16.

One of said spindles, 10, is used for driving the workpiece 17, the other spindle 11 driving a reference piece or master 18. In synchronism with the spindles (and in this case from spindle 11) a tachometric current generator 19 and a pulse generator 20 are driven. In this example the pulse generator 20 is shown in the form of a disc provided with a positioning data track 21 and a data point mark 22 adapted to deliver the starting impulse for the braking-indexing operation, this impulse being located angularly in the interval between said position data. Registering with the track 21 and with the path described by said point 22 are a position pulse pick-up 23 and a starting impulse pick-up 24 connected to a shaping circuit 25, respectively.

An electronic treatment unit E is provided which comprises another shaping and filter circuit to which the shaping circuit 25 of the data electronic unit Ei is connected via a transmission line. The initial or starting impulse data delivered from circuit 26 is fed to a memory 27 also adapted to receive the braking order from the sequential machining control means 28. This memory 27 is connected to a down counter 29 to which a preselector circuit 30 is associated for setting this counter in a predetermined digital condition, said down counter 29 being normally forced by the memory 27 whereby the position pulses fed directly to said counter from circuit 26 cannot be down counted under these specific conditions. The outputs of down counter 29 are connected to a D/A converter 31 having its output connected to an analog square-root extractor 32. The output of this extractor 32 is connected to a gain amplifier 33 adapted to adjust as a function of the down counter preselection the scale of the preset speed which is the analog magnitude issuing from this unit. This magnitude is normally fed through one way I of a two-way device I, II of switching means 34 (shown herein in the form of a relay comprising a movable-armature 34a) to an adder 41a, then to a comparator 35 to which the above-mentioned tachometric generator 19 is connected, said comparator 35 delivering an error signal amplified at 36 and then fed to the means 37 controlling the spindle braking step proper. The reference numeral 38 designates a device adapted to adjust the scale factor of the return loop of the speed servo-means.

The preset speed information issuing from amplifier 33 is also fed to the input of a threshold device 39 which, in conjunction with a function generator 40, is responsive to a predetermined threshold of the above-mentioned square-root extractor 32.

The output of said threshold device 39 is connected to the function generator 40 and also to the switching device 34 having its way II connected to the output of said function generator.

The generator 40 is adapted to generate an adjustable-gradient linear function corresponding to the preset speed of the spindles, as illustrated in phase II of FIG. 4, and can easily be obtained by associating a variable-gain adder with an adjustable-gradient integrator. Moreover, the down counter 29 is connected to a circuit 41 responsive to a predetermined count-down condition, for example a logic NEITHER circuit responsive to the O state of all the down counter outputs, and constituting a circuit for locking the spindle positions, its output being connected to the adder 41a interposed between the switching means 34 and the above-mentioned comparator 35, and preset to such level that it will exert the maximum braking effect on said spindle through said comparator.

The brake control device 37 is also connected to the sequential machining control system 28 in order to transmit thereto the 'no-braking' information constituting one of the necessary requirements for permitting the machining operation to proceed. This device operates as follows:

During the machining of a workpiece the electronic unit E plays no role except that of keeping the brake 14 in its released condition, this preset condition resulting from the aforesaid forcing of down counter 29 to its preselected numerical state and being transmitted through way I.

Upon completion of the machining step or operation, a clutch release order is issued to clutch 15 from the sequential control device 28 (or an order for de-energizing the driving motor 16 if no clutch is provided) and when the motor is uncoupled or de-energized the control device 28 delivers the braking order to the memory 27 which will thus be activated when the first expected information concerning a starting impulse is delivered from pick-up 24 via circuits 25 and 26. From this memory activation on the forcing of down counter 29 ceases and the count down of the position pulses from pick-up 23 via circuits 25 and 26 begins. Through converter 31, extractor 32 and amplifier 33, an analog signal representative of the preset speed of the spindles is transmitted via way I of switching means 34 to the braking control device 37, this braking-indexing phase corresponding to that shown at I in the velocity/time diagram of FIG. 4, and notably to the linear preset evolution preceding the parabolic evolution shown in dot and dash lines, which it assumes below a predetermined threshold.

When this threshold is attained, the threshold device 39 and the function generator 40 are activated, and at the same time the switching device 34 cuts off way I and restores way II connecting the function generator 40 to comparator 35 so that, without any discontinuity, said function generator 40 will control the second braking-indexing phase according to the linear law denoted II in the velocity/time diagram of FIG. 4.

Then, when the spindles approach the desired stopping position, and for a predetermined count down final condition of down counter 29, such as the state O of all the outputs thereof, the circuit 41, 41a triggers through way III, in response to this digital (and no more analog) information, the maximum braking control action to the spindles and these are stopped on a predetermined stroke the regularity of which permits of obtaining very easily the desired angular precision, notably of the order of one degree.

This phase is also illustrated at III in the velocity/time diagram of FIG. 4.

When the braking order to memory 27 is discontinued, the down counter 29 is again forced to its preselected numerical state, the switching means 34 being restored to way I and the braking control 37 urged to the brake release position while permitting the beginning of another machining cycle.

Although the present invention has been described with specific reference to typical forms of embodiment, it will readily occur to those conversant with the art that various modifications and variations may be brought thereto without departing from the basic principles of the invention as set forth in the appended claims.

What is claimed as new is:

1. A method of braking and indexing a mechanical member rotating at high speed comprising triggering the starting point of a high-speed indexing phase, and monitoring a braking action at least partially according to an optimum velocity/space curve of parabolic shape during three successive phases, the first phase being along a substantially linear section of a velocity/time curve corresponding to the velocity-space curve of parabolic shape having a numerical or digital definition, the second phase being along a linear velocity/time curve defined by a function generator and released below a certain threshold of said first phase, and the third phase being a final locking phase started in response to a predetermined final numerical information of said numerical or digital definition.

2. A braking and indexing device for a mechanical member rotating at high speed comprising a first pick-up to receive multiple pulses transmitted as a function of the angular position of said mechanical member, a second pick-up for receiving braking-action starting pulses transmitted in a predetermined angular position of said mechanical member, a preselectable digit-state down-counter to which said first pick-up is connected, a count-down permitting circuit responsive to a braking order, said count-down permitting circuit being interposed between said second pick-up and said digit-state down-counter for permitting the count down only from a specific pulse, a D/A or digit/analog converter for converting the output signals of said digit-state down-counter, an analog square-root extractor, connected to the output of said digit-state down-counter, for producing a first signal representing a preset speed of the mechanical member, a threshold device responsive to a predetermined threshold of said first signal during its linear evolution and co-acting with a linear-function generator for emitting a second signal representing the preset speed of said mechanical member, switching means responsive to said threshold device for transmitting in succession said first and second signals to a comparator to which a signal generator which generates signals representing the actual speed of said mechanical member is connected, a spindle braking control device responsive to an error signal transmitted from said comparator, and a comparator forcing circuit having a maximum braking control state responsive to a predetermined numerical state of the final count down of said digit-state down-counter.

3. A braking and indexing device according to claim 2, wherein said linear function generator comprises an adder and an integrator.

4. A braking and indexing device according to claim 2, wherein said comparator forcing circuit comprises an adder interposed between said switching means and said comparator.

5. A braking and indexing device according to claim 2 wherein said mechanical member comprises a spindle.

* * * * *